Oct. 11, 1960 R. B. SMITH 2,955,789
KNIFE RACK
Filed May 6, 1959 2 Sheets-Sheet 1
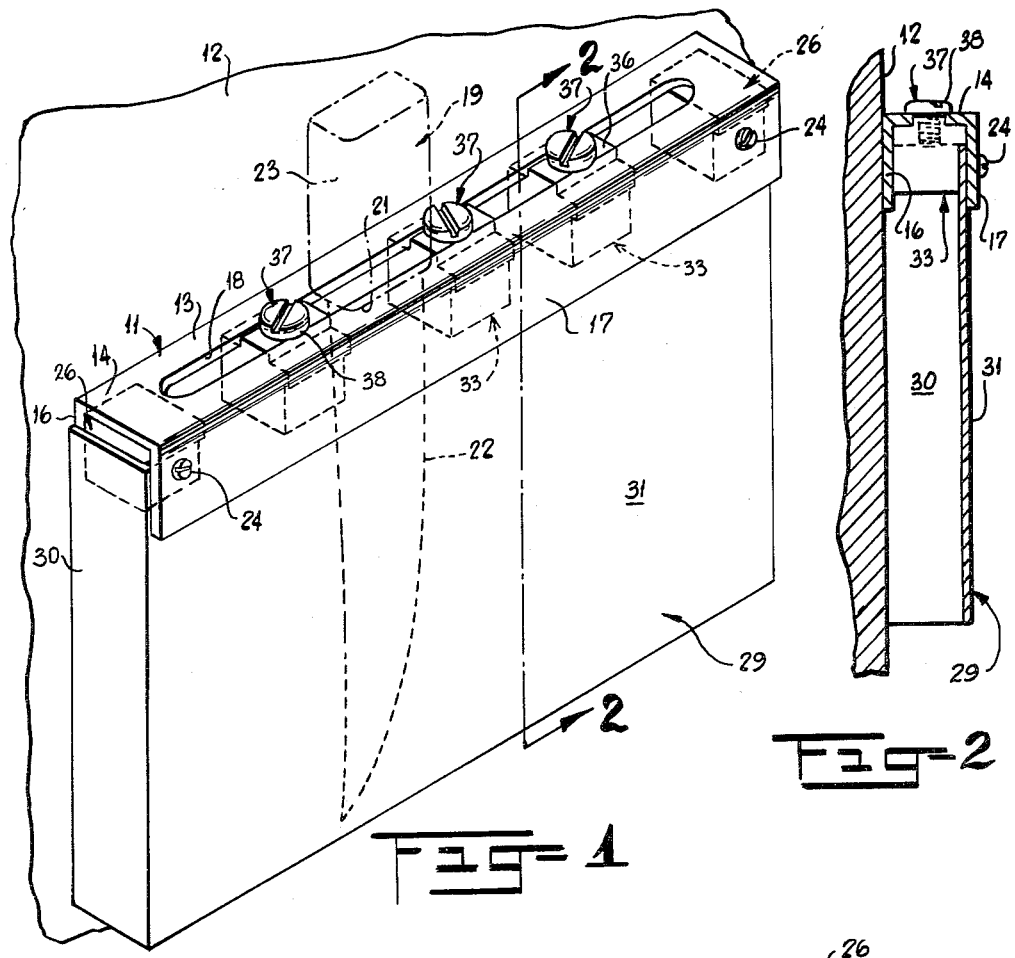
Fig-1
Fig-2
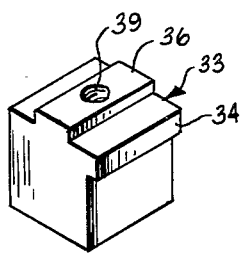
Fig-3
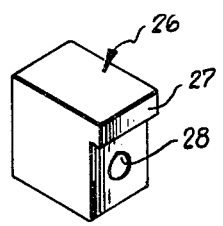
Fig-4
INVENTOR:
RICHARD B. SMITH.
BY Eaton, Bell, Hunt & Seltzer
ATTORNEYS

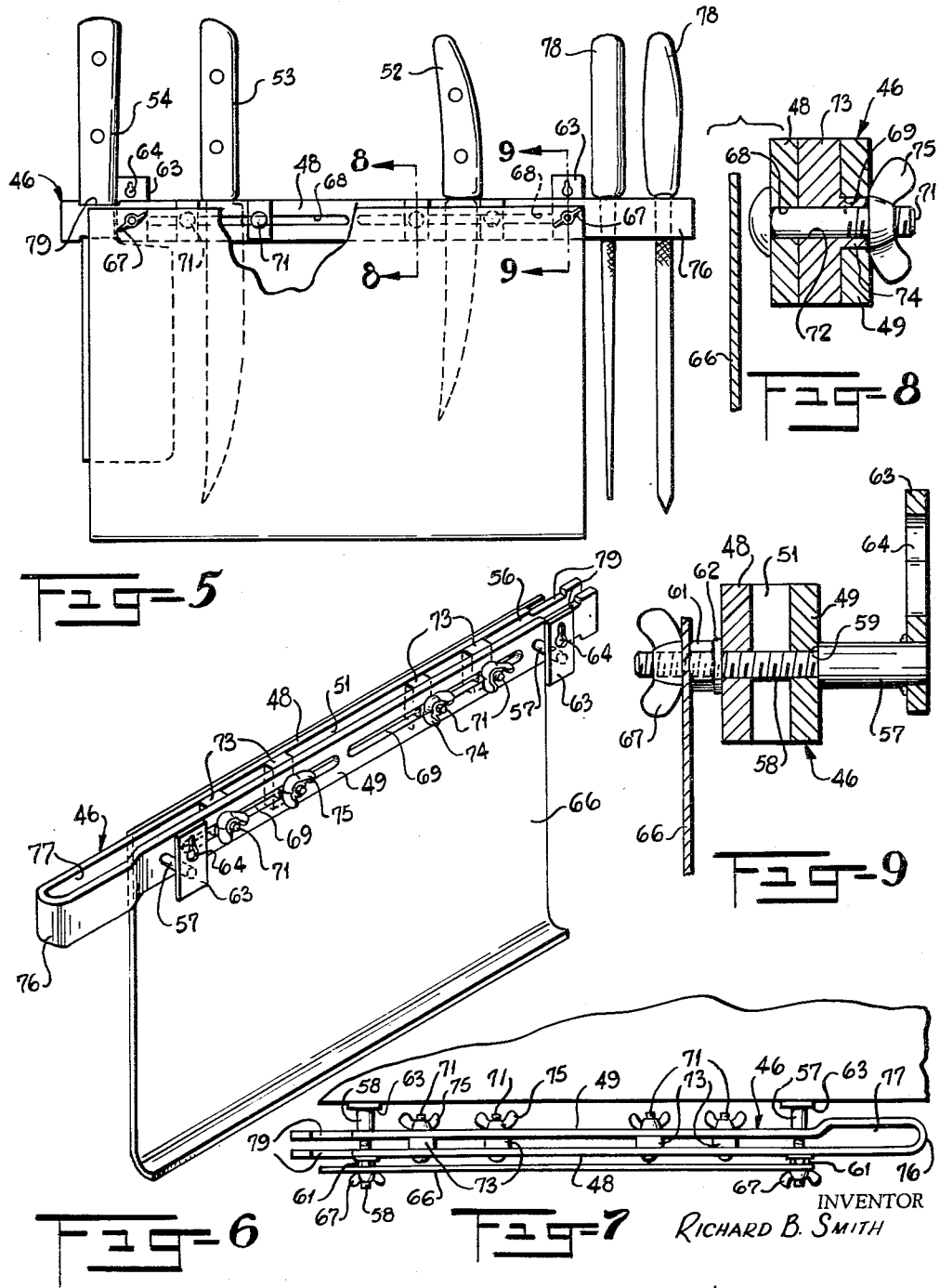

United States Patent Office 2,955,789
Patented Oct. 11, 1960

2,955,789
KNIFE RACK
Richard B. Smith, P.O. Box 713, Hickory, N.C.
Filed May 6, 1959, Ser. No. 811,432
18 Claims. (Cl. 248—37.3)

This invention relates to racks and more particularly to a rack for supporting a plurality of knives and analogous articles of cutlery.

It is often highly desirable to provide a plurality of items of cutlery such as knives of various sizes and blade configurations which are supported in a readily accessible manner to permit convenient selection of a specific knife as required for a particular cutting operation. Such an assortment of cutlery is desirable in the kitchen and particularly in installations such as meat markets, butcher shops and the like wherein continuous cutting operations take place. In the butcher shop, in particular, where meat is being continuously prepared for consumption, a wide variety of cutlery is generally provided such as cleavers, trimming knives, slicing knives, and the like, together with one or more rod-like sharpening devices generally referred to as "steels" employed to maintain a sharp edge on the knives. As can be appreciated, it is highly desirable that those knives which are in constant use be kept in a sharpened condition in order to facilitate the cutting operations and avoid delays brought about by frequent sharpening operations.

In the typical butcher shop, the meat cutting operations are carried out on a heavy wooden table or "block" and an assortment of knives required for the various cutting operations is generally supported in a rack suitably secured to one side of the block. Each of these knives is generally supported in the rack by engagement of a portion of the rack with the shoulder formed at the junction of the knife blade and handle so as to facilitate ready withdrawal and insertion of the knives.

Due to the wide variety of knife sizes and types commonly employed it is impractical to provide individual sheaths or scabbards for each knife and therefore such racks are generally provided with a common slot through which the knives loosely extend in closely spaced relationship so that the blades of adjacent knives are often in contact. The repeated insertion and withdrawal of the knives from the racks in use today often results in damaging or dulling of the knife blade edges due to contact with the adjacent knife blades and portions of the rack so that more frequent sharpening is required and the useful life of the knives is reduced.

Furthermore, as the handles of the knives project upwardly from the rack, they are in an exposed position where they are easily struck by a person passing thereby as well as by the butcher as he inserts and withdraws individual knives from the rack. This contact with the knife handle generally results in the knife blades striking one or more of the blades of the adacent knives supported in the rack so that further damage to the cutting edges of the knives results. Short-bladed knives are also easily knocked out of the knife rack.

Some knife racks have been provided with separate slots for reception of adjacent blades of particular widths. However, when a knife was to be replaced by another of different width, the slot might either be too long to maintain the blade and handle in upright position, or the slot might be too short to receive the blade.

Accordingly, a primary object of the invention is to provide a new and novel knife rack.

Another object of the invention is to provide a new and novel knife rack which permits a plurality of knives, analogous cutlery and "steels" to be supported with virtually no risk of damage to the knife blades from contact with adjacent knife baldes.

A further object of the invention is to provide a new and novel rack for cutlery, such as knives and the like, which is provided with adjustable means for defining therebetween blade-receiving openings each arranged to accommodate a knife having a blade of a specific width.

Still another object of the invention is to provide a new and novel rack for cutlery, such as knives and the like, which is simple and inexpensive in construction and which may be readily hung from a vertical wall member such as the side of a butcher's block.

Still another object of the invention is to provide a new and novel knife rack which is arranged to support a variety of knives in a segregated relationship for easy withdrawal and insertion and which is arranged to adjustably define a plurality of blade receiving openings for receiving individual knife blades and maintaining said blades in a segregated and upright position protected from contact with the blades of adjacent knives.

Briefly, the objects of the invention and other related objects are accomplished by providing an elongated supporting body which contains at least one elongated slot for the reception of the blades of a plurality of laterally spaced knives and analogous implements with their blades extending vertically downward. Each knife is supported by engagement of the shoulder formed at the junction of the knife handle and blade with the supporting body. Suitable means are provided for mounting the supporting body on a vertical wall member such as the side wall of a butcher's block or the like so that access to the knives is obtained and ready insertion and removal of the knives by grasping their handles may be accomplished. One or more spaced guides formed of a suitable resilient material, to avoid dulling the cutting edges of blades are slidably associated with the slot and are moved to a selected position in order to define therebetween an elongated blade-receiving opening for accommodating the blade of a knife. Clamping means are provided for clamping each of these spaced guides in a selected position to thereby define a plurality of blade-receiving openings for accommodating various blade widths of the knives supported on the rack.

Some of the objects of the invention having been stated, other objects will appear as the description proceeds when taken in connection with the accompanying drawings, in which—

Figure 1 is an isometric view of a knife rack constructed in accordance with the invention illustrating, in broken lines, one knife supported therein;

Figure 2 is a sectional view taken substantially along line 2—2 of Figure 1 in the direction of the arrows;

Figure 3 is an isometric view of a spacer guide employed in the knife rack of Figure 1;

Figure 4 is an isometric view of an end block or end guide incorporated in the knife rack of Figure 1;

Figure 5 is a front view of a modification of the knife rack of the invention illustrating various types of cutlery and a pair of "steels" supported therein;

Figure 6 is an isometric view illustrating the inner side of the knife rack of Figure 5;

Figure 7 is a top view of the knife rack of Figure 5;

Figure 8 is an enlarged sectional view taken substantially along line 8—8 of Figure 5; and Figure 9 is an enlarged sectional view taken substantially along line 9—9 of Figure 5.

Referring now to the drawings and to Figure 1 in particular, there is shown a knife rack designated generally by the numeral 11 which is arranged to be hung or otherwise supported from a vertical wall member 12. The knife rack 11 is most suitable for mounting on the side wall of a cutting block commonly found in butcher shops or the like so as to support a plurality of knives and analogous cutlery and thus permit the knives to be readily accessible to the butcher for performing various cutting operations.

The knife rack 11 comprises an elongated supporting body 13 which may be in the form of an angle bar or a flat, thin, bar suitably attached to wall member 12. In the specific embodiment illustrated, body 13 is in the form of a channel bar or has an inverted substantially U-shaped cross-section. Body 13 includes a top wall 14 and a pair of substantially parallel side walls 16, 17 as shown best in Figure 2. The body 13 is preferably formed from a strip of rigid material, such as metal or the like, and is provided with an elongated slot 18 which extends throughout the major portion of the length of the top wall 14. The slot 18 is thus arranged to receive the blades of a plurality of knives so that the handles of the knives project upwardly from the slot 18. One knife, designated generally by the numeral 19, is shown in Figure 1 supported in the rack 11 by engagement of the marginal edge portions of slot 18 with the shoulder 21 formed at the junction of the knife blade 22 and handle 23.

Any suitable means may be provided for securing the rack body 13 to the wall 12 such as screws 24 which extend through the side walls 16, 17 of the body 13 and threadedly engage the wall member 12. In the specific embodiment illustrated, end blocks designated generally by the numeral 26 and formed with a projecting portion or lip 27 are provided, one of which is shown clearly in Figure 4. The end blocks 26 are nested between the side walls 16, 17 adjacent each end of the body 13. Each of the end blocks 26 is suitably bored centrally at 28 to accommodate the mounting screw 24. The end blocks 26 are preferably formed at least in part from a laminated phenolic material but may be formed from any suitable resilient material such as rubber, plastic, leather, or the like, which does not dull the cutting edge of the blade upon contact therewith.

In order to shield or enclose the blades 22 of the knives supported in the body 13, an apron 29 formed from sheet metal or the like is preferably provided which contains end walls 30 and a front wall 31. The upper edge portion of the apron 29 is nested within the space between the body side wall 17 and the end block 26 defined by the lip 27 as shown best in Figure 2 and is fixedly held in the assembled position by the mounting screws 24. The apron 29 therefore extends vertically downward and in front of the knife blade 22 so that inadvertent contact with the blade is avoided.

As specifically illustrative of the invention, means have been provided on the knife rack 11 for adjustably defining one or more blade-receiving openings, each arranged to receive an individual knife blade and thus maintain the blades in a segregated, upright relationship so as to eliminate contact between adjacent blades. As shown best in Figures 1 and 3, spacer guides designated generally by the numeral 33 are slidably positioned within the slot 18. Adjacent guides 33 and the endmost of such guides, with the end blocks 26, define therebetween separate blade-receiving openings, each for accommodating an individual knife blade 22.

Each spacer guide 33 is preferably provided with a lip 34 for accommodating the upper edge portion of the apron 29 similar to the lip 27 on the end blocks 26. Each spacer guide is also provided with a projecting rib or tongue 36 along its upper surface which is positioned within the slot 18 when the spacer guides are located in the assembled position of Figure 1. The tongues 36 permit the spacer guides to be moved manually, and to be guided along the slot 18 to a selected position to readily form the blade-receiving openings defined thereby of the length to accommodate particular blades.

Means are also provided for clamping each spacer guide 33 in the selected position which in the specific embodiment comprises a screw designated generally by the numeral 37 having a slotted head 38. The clamping screw 37 is arranged to be engaged with an internally threaded bore 39 extending vertically through the spacer guide 33. The ribs 36 may be of lesser height than the thickness of top wall 14 so that, by tightening each clamping screw 37, the respective spacer guide 33 is drawn into tight engagement with the lower surface of top wall 14, adjacent the edge portions of slot 18 and held in the selected position. Any suitable means such as a screw-driver may be used for manipulating the screws 37 and the screw heads 38 are readily accessible from above the rack body 13.

When knives of various blade widths are to be supported in the knife rack 11, the clamping screws 37 of each spacer guide 33 are loosened so as to permit each spacer guide to be moved to a selected position along the slot 18. The spacing between adjacent spacer guides as well as the spacing between the spacer guides at each end and its associated end block 26 is therefore selected so as to define blade-receiving openings for accommodating therebetween knife blades of predetermined width.

Each spacer guide 33 is then secured by tightening the clamping screw 37, and each of the supported knives, of which knife 19 is representative, may be readily inserted and withdrawn from its appropriate opening. The nesting of the knife blade 22 between adjacent spacer guides 33 therefore prevents the knife blade from moving more than a negligible amount from the vertically supported position so the knife will not be accidently dislodged from the rack and the guides 33 and blocks 26 also prevent contact between adjacent knife blades so that the sharpened knife blade edges are preserved. The surfaces of the spacer guides 33 which are likely to contact the knife blades or if desired the entire spacer guide 33 is preferably formed from a laminated phenolic material but may be formed from any suitable relatively soft or yieldable material such as rubber, plastic, leather, or the like, which does not dull the cutting edge of the blade upon contact therewith.

Referring now to Figures 5–9, there is shown a modification of the knife rack of the invention which employs a supporting body designated generally by the numeral 46. In the modification, the knife rack comprises an elongate supporting body 46 which is preferably formed from rigid material such as metal or the like. Body 46 comprises a pair of substantially parallel side walls 48, 49 defining therebetween an elongated main, substantially vertical slot 51 for receiving the blades of a plurality of knives and/or "steels" as shown in Figure 5. As in the previous embodiment, the body 46 is arranged to accommodate a variety of knives, three of which have been designated in Figure 3 by the numerals 52—54.

Side walls 48, 49 may be separate, suitably interconnected, elements or they may be integrally formed by folding an elongated bar at its medial portion, as shown in Figures 5, 6 and 7.

In order to aid in maintaining the side walls 48, 49 of body 46 in predetermined spaced relationship, and to permit hanging body 46 from an appropriate wall member, a pair of rods 57 are provided, each of which includes a reduced threaded portion 58, the inner end thereof defining a shoulder 59 with the shoulder engaging wall 49, and the reduced threaded portion extending through suitable holes in the side walls 48, 49. The side walls 48, 49 are therefore confined in the desired predetermined spaced relationship by means such as nuts 61 and washers 62 engageable with the respective reduced threaded rod portions 58. The mounting plate 63 containing a keyhole slot 64 may be fixedly secured to one end of each rod 57 as shown best in Figure 9 so that the keyhole slot 64 will engage a suitable "headed" projection or the like (not shown), extending outwardly from the supporting wall member, to support the body 46 in spaced relationship with the wall member.

As in the previous embodiment, an apron 66 may be provided for enclosing the blades of the knives supported in the knife rack of the invention. Apron 66 is preferably supported, as shown best in Figure 9, from each threaded rod portion 58 and is secured in the supported position by means of a wing nut 67.

Referring now to Figure 6, means are provided on the rack body 46 for defining blade-receiving openings each of which receives the blade of a knife supported on the rack and maintains each knife blade segregated and in substantially upright position, as in the previous embodiment. More specifically, the side walls 48, 49 of the body 46 are provided with one or more longitudinally extending, opposed pairs of lateral guide slots 68, 69 respectively. Two of such pairs of guide slots 68, 69 are employed in the illustrated embodiment in order not to weaken the body but it should be understood that a single guide slot may be provided in the wall 49 only, or a single pair of slots or more than two pairs of slots may be provided in one or both walls, all within the scope of the invention.

As shown best in Figure 5, each front slot 68 is arranged to receive one or more bolts 71, each of which bolts extend through a central bore 72 (Figure 8) in a spacer guide 73 positioned within the main slot 51. Each of the spacer guides 73 is preferably, but not necessarily formed with a rib or tongue 74 receivable within the other rear guide slot 69 so as to aid in supporting and guiding the spacer guides 73 as they are moved within the main slot 51. Each spacer guide may be releasably secured in a selected position between the side walls 48, 49 by means of a wing nut 75 engageable with the end of the bolt 71.

As in the first embodiment of the invention, the spacer guides 73 are arranged to be moved slidably along the main slot 51 between the body side walls 48, 49. The spacer guides therefore define therebetween blade-receiving openings of a selected width for receiving the blade of a knife. Therefore, insertion and withdrawal of each knife from its appropriate blade-receiving opening may be readily accomplished in a simple and easy manner while the spacer guides 73 maintain the individual knives in a segregated and protected relationship. Furthermore, each spacer guide 73 may be preferably formed from a resilient material similar to the spacer guides 33 which will not dull the sharp cutting edge of the knives supported in the rack as previously discussed. It is thus seen that the spacer guides of each form of the invention are adjustably supported for movement in the vertical planes of the slots formed in the top walls of the respective knife racks, upper edges of side walls 48, 49 forming the top wall of the second form of knife rack, in this instance.

If desired, corresponding ends of side walls 48, 49 may be spread further apart than the major portions thereof to define a space or enlarged vertical slot 77 for receiving the blade of one or more "steels" 78 of the well known type commonly employed to restore the cutting edge to a knife. Since body 46 is shown as being of one-piece construction, space 77 is provided at the bight end 76 of body 46. At the other end of the body 46, notches 79 may be provided for supporting a cutting device such as the cleaver 54 and the notches 79 receive the lower end of the handle of cleaver 54 to prevent movement of the cleaver along the body 46.

It can be seen that there has been provided with this invention a knife rack which is capable of supporting a plurality of assorted knives and analogous cutlery in a readily available manner so that the use of the knife by individuals such as a butcher or the like is readily facilitated and no usable space is wasted. The knife rack of the invention permits quick and easy insertion of and withdrawal of the knives from the knife rack, but at the same time, prevents damage to the sharpened edges of knife blades either while they are stored in the rack or during such insertion and withdrawal. Any of a large variety of knives and analogous cutlery may be readily supported in the knife rack of the invention in the above discussed manner with a simple adjustment so that each knife in essence is provided with an individual scabbard. The knife rack of the invention also permits full usage of the knife rack, since the guides or dividers can be adjusted to accommodate any and all widths of knives and the like. Thus, none of the blade-receiving openings need remain unused because a blade could not properly fit therein, as has been the case with prior knife racks. It follows, therefore, that no space is wasted.

In the drawings and specification there have been set forth several preferred embodiments of the invention and although specific terms are employed they are used in a generic and descriptive sense only and not for purposes of limitation the scope of the invention being defined in the claims.

I claim:

1. A knife rack comprising an elongated flat and relatively thin body of unitary construction having at least one elongated slot therein for the reception of the blades of knives, means dividing said slot into a plurality of openings having variable lengths to removably receive knife blades having respective widths corresponding to the lengths of the openings, said means comprising at least one spacer guide slidably received in said slot for maintaining knife blades in adjacent openings in spaced apart relationship, and means for adjusting said spacer guide longitudinally with respect to said slot to vary the lengths of said adjacent openings in accordance with the widths of the knife blades to be received therein.

2. A structure according to claim 1 including means for guiding said spacer guide for movement in substantial alinement with said slot when the spacer guide is adjusted longitudinally of said slot.

3. A structure according to claim 2 in which said guiding means comprises a rib integral with said spacer guide and loosely fitting in said slot.

4. A knife rack comprising, in combination, a supporting body having at least one elongated slot for the reception of a plurality of laterally spaced knife blades extending vertically downwardly, means dividing said slot into a plurality of openings having variable lengths to removably receive knife blades having respective widths corresponding to the lengths of the openings, said means comprising a plurality of spacer guides slidably positioned in said slot, and means for adjustably securing said spacer guides in selected spaced apart positions along said slot to vary the lengths of said plurality of openings in accordance with the widths of the knife blades to be received therein, adjacent spacer guides defining therebetween an opening for accommodating a knife blade of predetermined width and restraining movement of the blade from vertically extending position.

5. A knife rack comprising, in combination, a supporting body having at least one elongated slot for the reception of a plurality of laterally spaced knife blades extending vertically downwardly, a plurality of spacer guides slidably positioned in said slot, guide means integrally formed on said spacer guides for guiding the movement of said spacer guides in said slot, means for securing said spacer guides in a predetermined position in said slot, adjacent spacer guides being thereby arranged to define therebetween an opening for accommodating a knife blade of predetermined width and for restraining movement of said blade from said vertically extending position.

6. A knife rack in accordance with claim 5 including a downwardly depending apron secured to said supporting body for shielding the downwardly extending knife blades.

7. A knife rack in accordance with claim 5 wherein said supporting body is arranged to be positioned with said slot extending in a substantially horizontal plane and wherein said spacer guide securing means are arranged to clamp said spacer guides to the edge portions of said supporting body adjacent said slot.

8. A knife rack comprising an elongated supporting body having a top wall and at least one side wall, said top wall having an elongated main slot therein for the reception of the blades of a plurality of knives having enlarged handles thereon and with said blades extending vertically downwardly through said slot, means for securing said body to a supporting wall to position said top wall in a substantially horizontal plane, a plurality of spacer guides made, at least in part, from a yieldable material, means for adjustably supporting sid spacer guides for longitudinal adjustment parallel to and in the vertical plane of said main slot whereby said spacer guides may be adjusted to predetermined relative positions to define therebetween respective openings for accommodating respective blades of predetermined width and for preventing longitudinal movement of said blades and maintaining the knives and respective blades in upright position.

9. A structure according to claim 8 in which the means for adjustably supporting said spacer guides comprises a rib projecting upwardly from each spacer guide and being loosely positioned within said slot, and releasable means for securing said ribs in said slot.

10. A structure according to claim 8 in which said side wall of the supporting body is provided with at least one elongated guide slot therein extending substantially parallel to the top wall, said means for adjustably supporting said spacer guides comprising a relatively narrow rib integral with each spacer guide and adapted to loosely fit within the guide slot in said side wall, and means to releasably secure the ribs of the respective spacer guides in said guide slot.

11. A knife rack comprising, in combination, a supporting body of substantially inverted U-shaped cross-section to provide a top wall and a pair of side walls, said top wall having an elongated slot for the reception of the blades of a plurality of laterally spaced knives with said blades extending vertically downwardly, means for securing one of said side walls to a supporting wall to position said slot in a substantially horizontal plane, a plurality of spacer guides slidably positioned in said slot, said spacer guides being composed at least in part of material which is non-injurious to the cutting edge of said knife blades, a clamping member on each of said spacer guides for clamping said spacer guides in selected positions to the edge portions of said body adjacent said slot, adjacent spacer guides being thereby arranged to define therebetween an opening for accommodating a knife blade of predetermined width and for restraining movement of said blade from said vertically extending position, and a downwardly depending apron secured to the other side wall of said supporting body for shielding said downwardly extending knife blades.

12. A knife rack comprising, in combination, a supporting body having a pair of side walls arranged in substantially parallel relationship, said side walls being arranged to define a vertically extending slot for the reception of the blades of a plurality of laterally spaced knives with said blades extending vertically downwardly, a plurality of spacer guides slidably positioned in said slot, and means associated with said side walls for securing said spacer guides in a predetermined position in said slot to define an opening between adjacent spacer guides for accommodating a knife blade of predetermined width and thereby restrain movement of said blade from said vertically extending position.

13. A knife rack in accordance with claim 12 wherein said spacer guide securing means include at least one pair of longitudinally extending, opposed guide slots in said side walls, and a clamping device for each of said spacer guides extending through said pair of guide slots.

14. A knife rack in accordance with claim 12 including means for hanging said supporting body in spaced relationship with a vertical wall member and a downwardly depending apron on said body for shielding said knife blades.

15. A knife rack in accordance with claim 12 wherein said supporting body comprises an elongated strip of rigid material folded on itself into a substantially U-shaped configuration.

16. A knife rack in accordance with claim 15 wherein the portion of said folded strip adjacent its bight is enlarged to provide an enlarged knife blade receiving space.

17. A knife rack comprising, in combination, a supporting body formed from an elongated strip of rigid material folded on itself into a substantially U-shaped configuration to provide a pair of side walls defining a vertically extending blade-receiving slot for the reception of the blades of a plurality of laterally spaced knives with said blades extending vertically downwardly, means on said supporting body for hanging said body in spaced relationship with a vertical wall member, said side walls having at least one pair of longitudinally extending, opposed guide slots, a plurality of spacer guides positioned in the blade-receiving slot between said side walls, a clamping bolt for each of said spacer guides extending through said pair of guide slots for securing said spacer guides in a predetermined position in said blade-receiving slot so that adjacent spacer guides define therebetween an opening for accommodating a knife blade of predetermined width to thereby restrain the movement of said blade from said vertically extending position.

18. A knife rack comprising an elongated body having an elongated slot therein, said body including a pair of side walls in spaced apart relationship, said side walls respectively extending along opposite sides of said slot, and means integral with said side walls and connecting said side walls together to form said body as a unitary element, at least one spacer guide slidably received in said slot, said spacer guide dividing said slot into adjacent openings for respectively receiving knife blades in spaced apart relationship, and means for adjusting said spacer guide longitudinally with respect to said slot to vary the lengths of said adjacent openings in accordance with the widths of the knife blades to be received therein.

References Cited in the file of this patent

UNITED STATES PATENTS

| | | |
|---|---|---|
| 2,183,074 | Hopkins | Dec. 12, 1939 |
| 2,566,082 | Droshine | Aug. 28, 1951 |
| 2,571,972 | Wagner | Oct. 16, 1951 |
| 2,646,903 | Draper | July 28, 1953 |
| 2,848,734 | Ault | Aug. 26, 1958 |
| 2,852,144 | Reno | Sept. 16, 1958 |